(12) United States Patent
Libner

(10) Patent No.: US 6,554,347 B1
(45) Date of Patent: Apr. 29, 2003

(54) TRANSPORT CONTAINER WITH SLIDING CURTAINS

(75) Inventor: Hervé Libner, Saint Maixent l'Ecole (FR)

(73) Assignee: S.A. Libner, St. Maixent l'Ecole (FR)

( * ) Notice: Subject to any disclaimer, the term of this patent is extended or adjusted under 35 U.S.C. 154(b) by 0 days.

(21) Appl. No.: 09/958,124

(22) PCT Filed: Apr. 7, 2000

(86) PCT No.: PCT/FR00/00892

§ 371 (c)(1),
(2), (4) Date: Jan. 18, 2002

(87) PCT Pub. No.: WO00/61398

PCT Pub. Date: Oct. 19, 2000

(30) Foreign Application Priority Data

Apr. 9, 1999 (FR) .......................................... 99 04474

(51) Int. Cl.[7] .................................................. B60J 5/06
(52) U.S. Cl. ........................ 296/155; 296/141; 160/206
(58) Field of Search ................................ 296/138, 141, 296/155, 181, 183; 160/199, 206, 207

(56) References Cited

U.S. PATENT DOCUMENTS

| | | | | |
|---|---|---|---|---|
| 2,827,957 A | * | 3/1958 | Haws | 160/199 |
| 3,267,990 A | * | 8/1966 | Harris | 160/199 |
| 3,481,388 A | * | 12/1969 | Smart | 160/84.08 |
| 3,810,274 A | * | 5/1974 | Ford et al. | 16/380 |
| 4,943,110 A | * | 7/1990 | Pastva | 296/181 |
| 5,025,846 A | * | 6/1991 | West | 160/199 |
| 5,176,388 A | | 1/1993 | Horton | 296/155 |
| 5,215,349 A | * | 6/1993 | Horton | 296/181 |

FOREIGN PATENT DOCUMENTS

| | | |
|---|---|---|
| DE | 296 08 103 U | 8/1996 |
| EP | 0 131 706 A | 1/1985 |
| FR | 2 313 531 A | 12/1976 |
| GB | 2 174 136 A | 10/1986 |
| GB | 2 267 108 A | 11/1993 |

* cited by examiner

Primary Examiner—D. Glenn Dayoan
Assistant Examiner—Paul Chenevert
(74) Attorney, Agent, or Firm—Young & Thompson

(57) ABSTRACT

An independent transport container or a transport container mounted on a vehicle such as a truck, trailer or railway car, includes a generally rectangular-shaped horizontal loading surface whereby at least one lateral surface is fitted with tarpaulin side walls that are mounted in such a way that they can slide in a longitudinal direction on an upper rail. The tarpaulin side walls are hooked to a set of rigid louvers which can be folded like an accordion, whereby the upper end of the louvers slides on an upper rail with the aid of carriages which are provided with casters and the lower end slides on a lower rail, bearing the upper rail, with the aid of lower chariots which are provided with rollers.

15 Claims, 8 Drawing Sheets

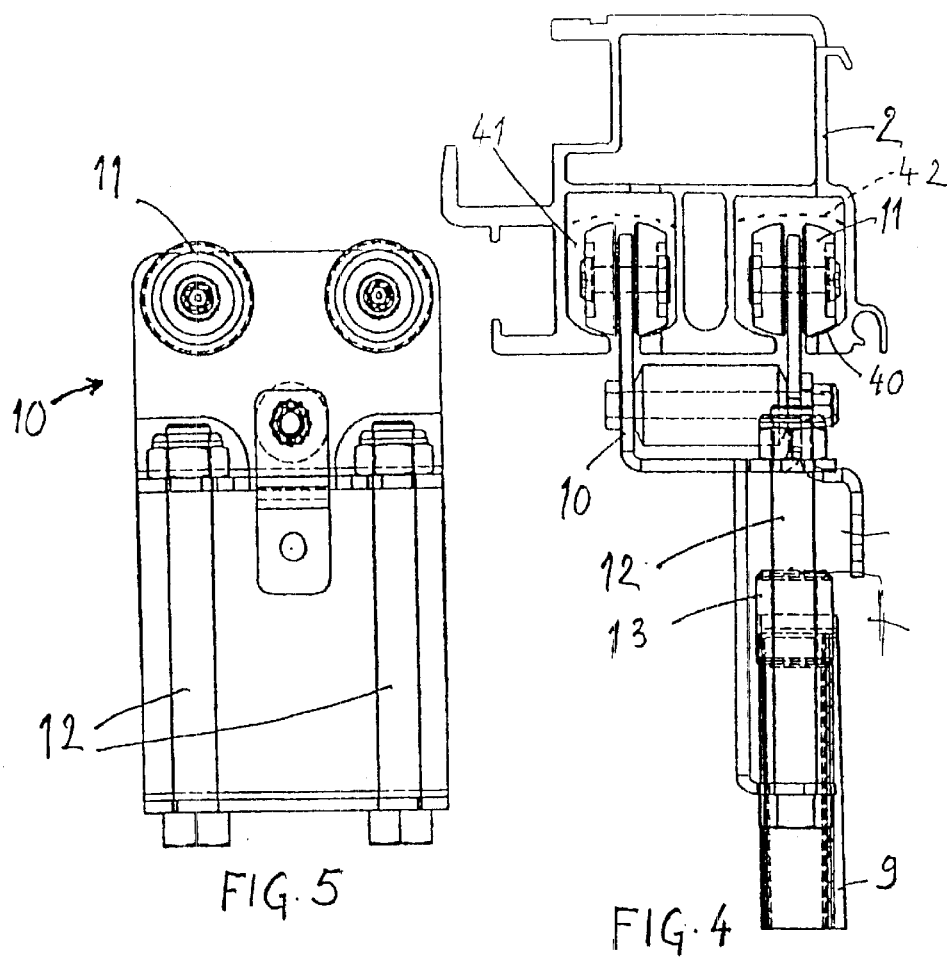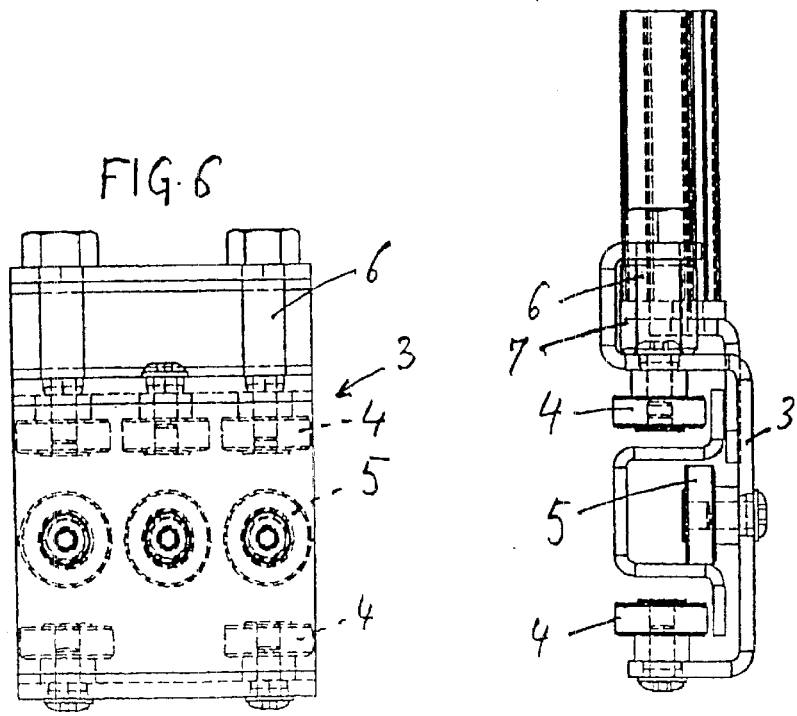

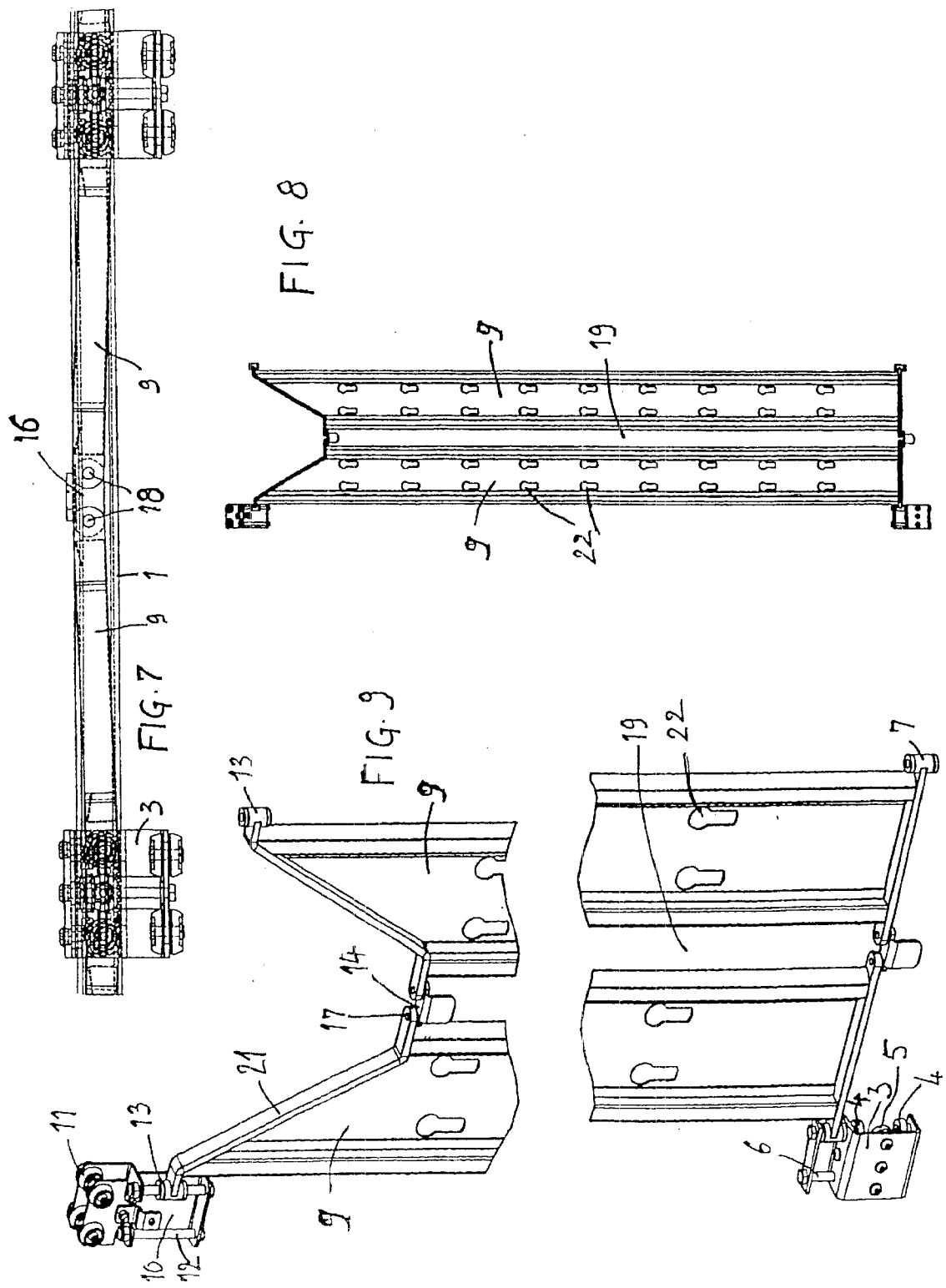

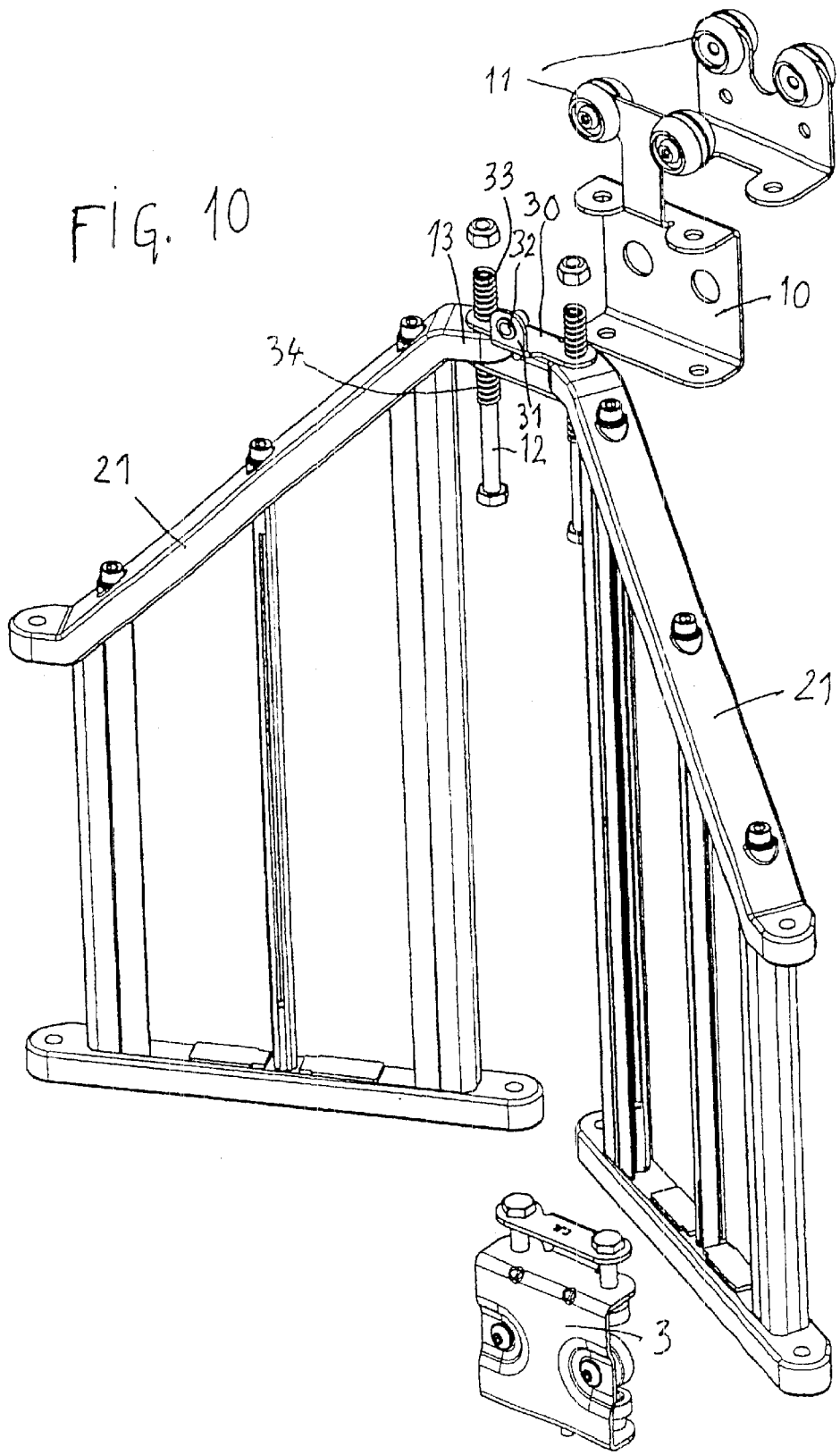

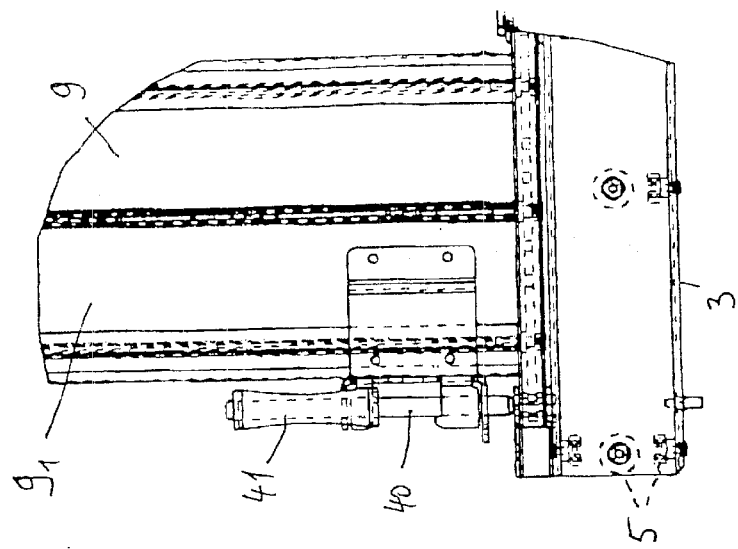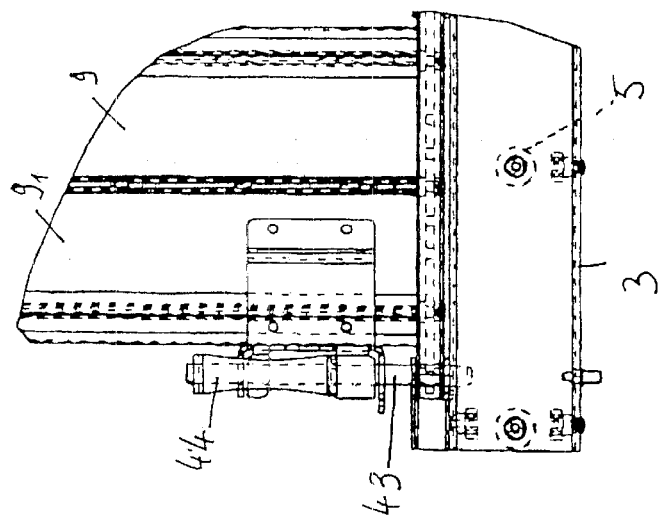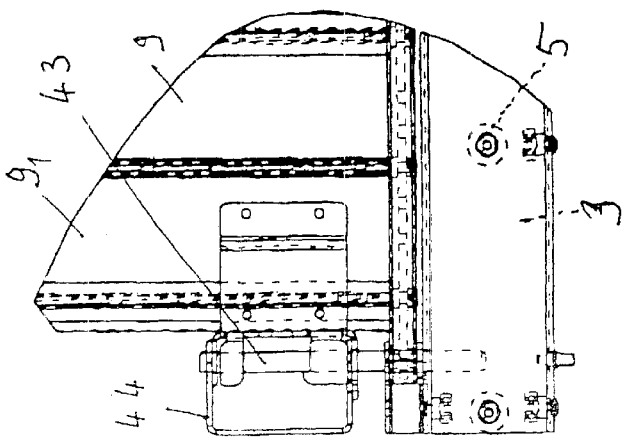

TRANSPORT CONTAINER WITH SLIDING CURTAINS

BACKGROUND OF THE INVENTION

The present invention relates to a transport container that is independent or mounted on a vehicle such as a truck, a trailer, a railway car, etc. of which at least one side wall is provided with sliding curtains.

There is known, for example in trucks and trailers of great length, a system of sliding side walls, comprising a plurality of. curtain walls or tarpaulins mounted on upper rollers, whose horizontal tension is ensured by snaps on the front or rear surface and the vertical tension by straps disposed at distances of the order of 600 or 700 mm. Such a system offers the advantage of total rapid opening, of being light and being low cost. It however suffers from serious drawbacks.

In particular, it requires three or four intermediate posts to support the upper rail which permits ensuring that the tarpaulin will have a good vertical tension. Moreover, the vehicle must be provided with internal protection to prevent the merchandise from falling on the curtains, these protections being provided by side panels in the lower portion and/or horizontal blinds of aluminum or wood which prevent access to the interior of the vehicle and require being disassembled.

The handling of the sliding side walls is moreover long and complicated, requiring hooking and unhooking numerous straps as well as remounting and unmounting the internal protections.

A major drawback of tarpaulin side walls is their low resistance to breaking and entering, which can take place simply by cutting the curtain by means of a cutter. The mounting of accessories, such as hooking bars or a padding, is difficult.

Among other drawbacks, can also be noted the projection widthwise of the vehicle, of the vertical tensioning straps, which increases the overall width of the vehicle and moreover gives rise to great difficulty of washing in roller washing stations.

There is moreover known, from GB-A-2.267.108, a system of sliding curtains for lateral openings of vehicles, in which a curtain is suspended from upper rollers carried by plates that are themselves secured to vertical metal strips, as in the prior art. However, instead of fixing the curtain to the lower part by hooks, this document provides the lower part of the curtain with rollers coacting with a lower rail. The system described in this document however does not permit solving the problems set forth above. An analogous solution is described in EP-A-0.131.706.

GB-A-2.174.136 discloses a system according to the described state of the art, but in which the lower portion of the curtain is provided with a flexible reinforcement plate fixed on sliding posts which themselves carry the curtain.

If this system provides partial solution to the problem of breaking in, the other problems that arise are not solved.

FR-A-2.313.531 discloses a system of tarpaulins constituted by arches sliding at their lower portion in roller tracks, by means of mechanical drive, the tarpaulin being carried by said arches. This tarpaulin system provides no satisfactory solution to all of the problems set forth above.

The same is true of U.S. Pat. No. 5,176,388, which discloses a flexible wall mounted on a metallic curtain with crossbars, the wall comprising pockets permitting absorbing bending deformations.

DE 29608103, which discloses a classic folding curtain system provided with reinforcement plates, permits only improving the resistance to breaking in, without solving the other problems that arise.

SUMMARY OF THE INVENTION

The present invention accordingly seeks to provide a new system of closure for sliding curtains, but does not have the drawbacks of the known systems.

To this end, the invention has for its object a transport container, independent or fixed on a vehicle such as a truck, a trailer or a railway car, of the type comprising a horizontal loading surface of generally rectangular shape of which at least one side surface is provided with tarpaulin side walls mounted longitudinally slidably on an upper rail, characterized in that said tarpaulin walls are hung from an assembly of foldable rigid louvers in accordian form, the upper end of said louvers sliding on an upper rail by means of carriages with casters while the lower end slides on a lower rail, carrying the upper rail, by means of lower carriages with rollers.

The inventive idea which is the basis of the present invention consists in closing the openings of the container by assemblies of accordian foldable rigid louvers on which are hung tarpaulin walls.

The rigid louvers can be metallic, of wood, of synthetic material, of composites, etc.

According to a preferred embodiment of the invention, the louvers are assembled pairwise, two louvers pivoting respectively on an upper articulation member and on a lower articulation member.

Preferably, in each pair of louvers, the upper edges of each louver are inclined convergently downwardly, which permits receiving the folds of the tarpaulin. To facilitate this folding, the invention also provides that the upper edge of the louver is provided with a sealing bib or a folded edge, such that the folding is forced downwardly.

Preferably, at least some of the louvers are provided with holes, preferably in the form of locking holes, which lighten the assembly and permit the mounting of accessories such as suspension rods, padding, etc.

BRIEF DESCRIPTION OF THE DRAWINGS

The invention will be better understood from a reading of the following description of one embodiment, with reference to the accompanying drawings, in which:

FIG. 4 is an elevational end view of the structure of FIGS. 1 to 3, FIG. 5 is a front elevational view of an upper carriage of the structure of FIGS. 1 to 4, FIG. 6 is a front elevational view of a lower carriage of the structure of FIGS. 1 to 4, FIG. 7 is a plan view from below, of the structure of FIGS. 1 to 4, FIG. 8 is a front elevational view of a structural element according to FIGS. 1 to 4, in a modification, FIG. 9 is a perspective view of the assembly of FIG. 8, in an intermediate open position, FIG. 10 is an exploded perspective view of a pair of louvers, for a modified embodiment, FIGS. 11, 12 and 13 are side elevational views of a lower portion of an end louver provided with a bolt, for three positions of the bolt, respectively.

DETAILED DESCRIPTION OF THE PREFERRED EMBODIMENTS

Figure 1:
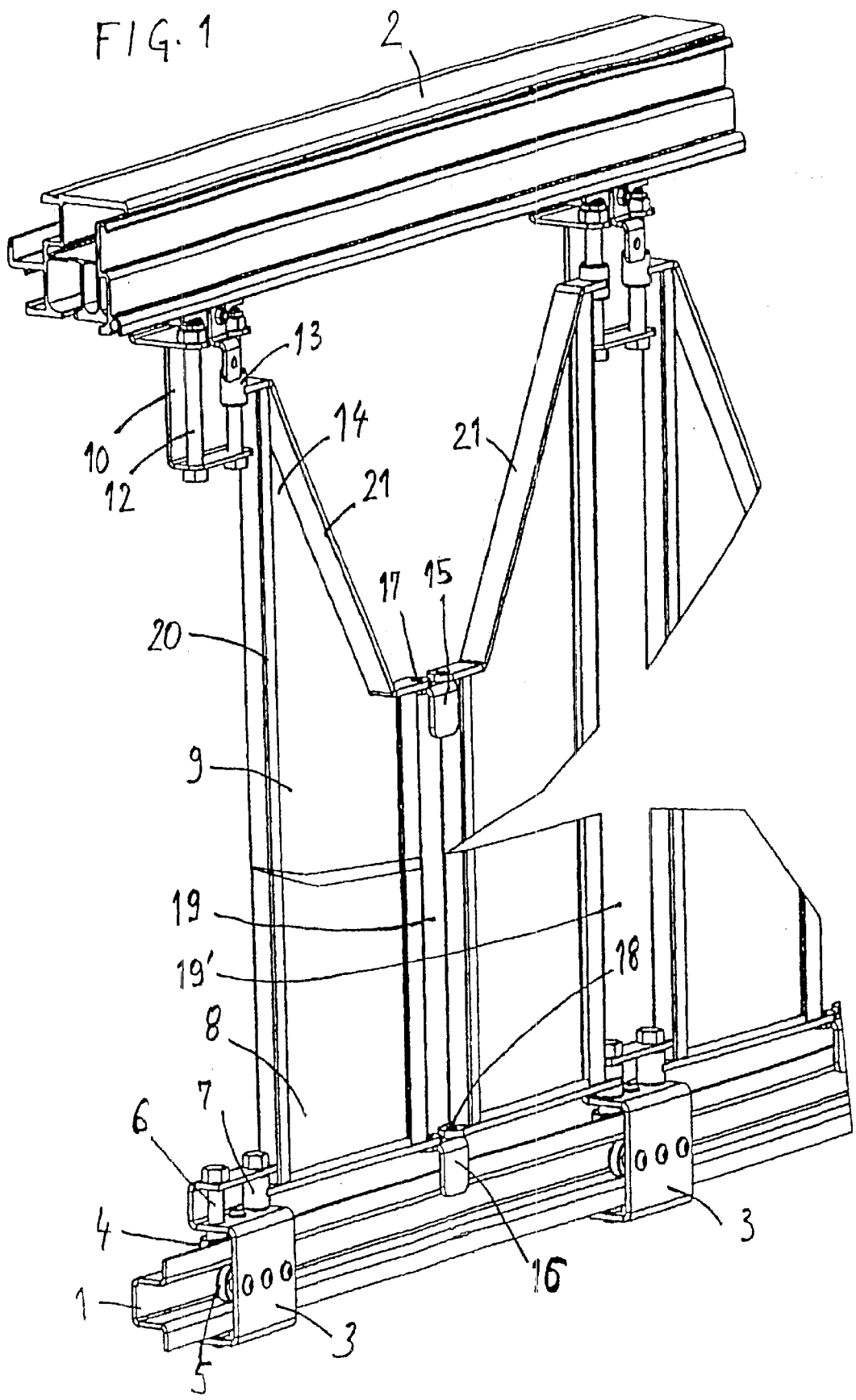
FIG. 1 is a side perspective view of a portion of a structure according to the invention, in the closed position.
Figure 2:
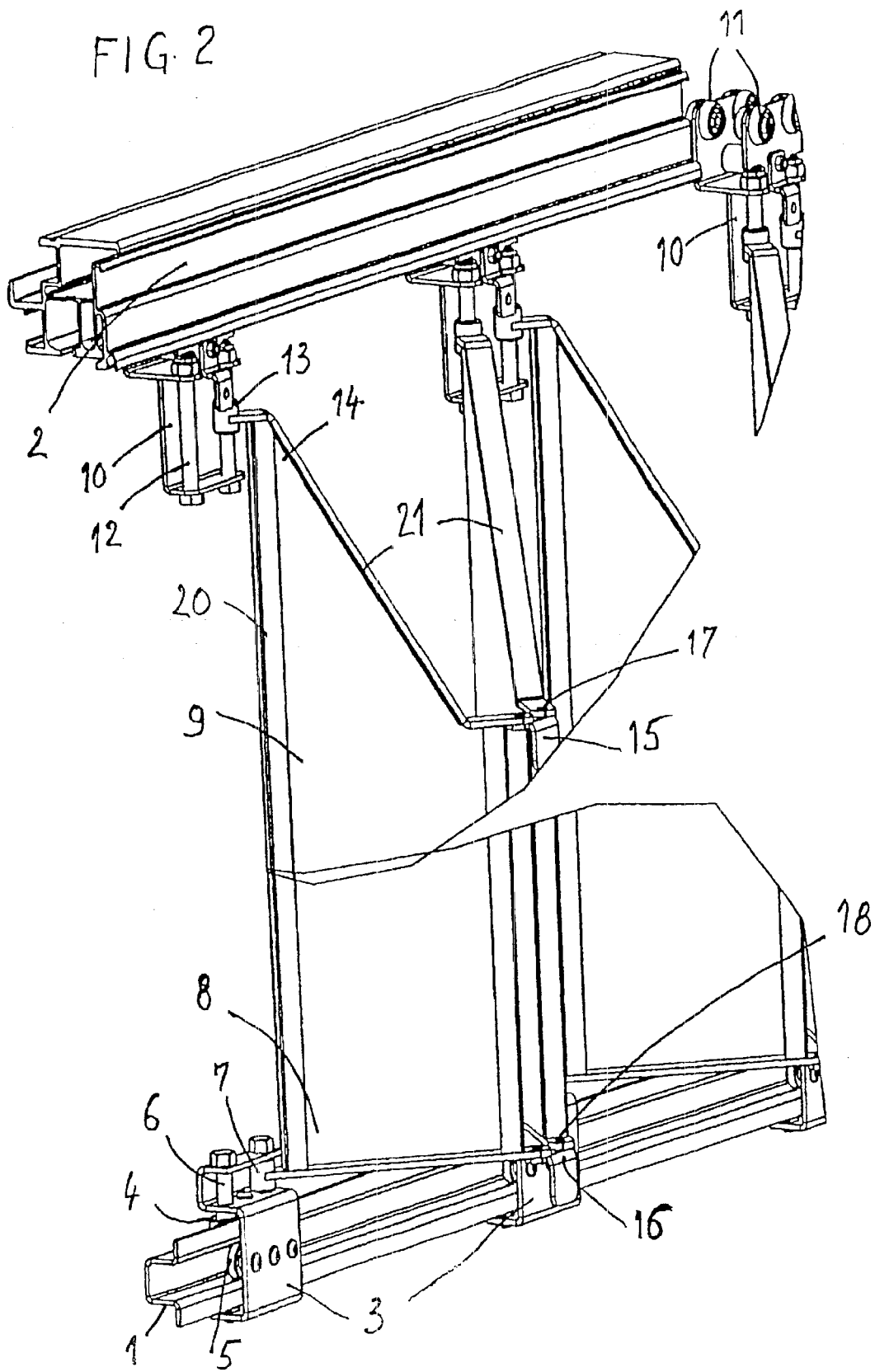
FIG. 2 is similar to FIG. 1, in an intermediate open position.

In the drawings, there is shown, for reasons of clarity, only the structure for carrying the tarpaulin.

The structure according to the invention comprises a lower profiled rail 1 of steel or aluminum, which can be fixed to a platform (not shown) of a vehicle, and an upper rail 2 also profiled, which is convertionally carried by the lower rail 1 between two end posts (not shown) of the vehicle.

A plurality of lower carriages 3 provided with two series of horizontal rollers 4 and one series of vertical rollers 5, slide on the lower rail 1 while being completely guided, preferably with close guiding, by the coaction of the horizontal rollers 4 and vertical rollers 5 with corresponding surfaces of the rail profile 1. Each lower carriage 3 moreover carries two vertical articulation axles 6 of a sleeve 7 secured to a Lower lateral end 8 of a louver 9, the pivoting of the sleeve 7 taking place practically without play.

From the upper rail 2 are suspended upper carriages 10 provided with two pairs of vertical casters 11. Each upper carriage 10, disposed facing a lower carriage 3, carries two vertical axles 12 on each of which can slide vertically a sleeve 13 secured to the upper side end 14 of a louver 9. Each caster 11 rolls on the rounded bottom 40 of a longitudinal closed recess 41 in the upper rail 2. So as to limit the movement of the caster 11 and to improve guidance, the top 42 of the recess 41 is preferably rounded, as shown in broken line in FIG. 4.

Between two assemblies of lower carriages 3 and upper carriages 10, that are respectively aligned vertically, two louvers or shutters 9 are assembled in a pair, the two shutters of a pair being respectively articulated at their edge opposite the sleeves 7, 13 on an articulation member or upper connection 15 and an articulation member or lower connection 16 carrying respectively two articulation axles 17 and 18. The connecting members 15 and 16 are shaped so that they form, in the closed position (FIGS. 1 and 7), abutments for the louvers 9 by holding the pair of louvers at a slight reentrant angle so as to facilitate their opening and to hold the tarpaulin slightly stretched, while providing between the two shutters 9 of the pair a narrow slot 19 necessary for pivoting. The slot 19' of comparable width is provided between the pairs of louvers.

Figure 14:
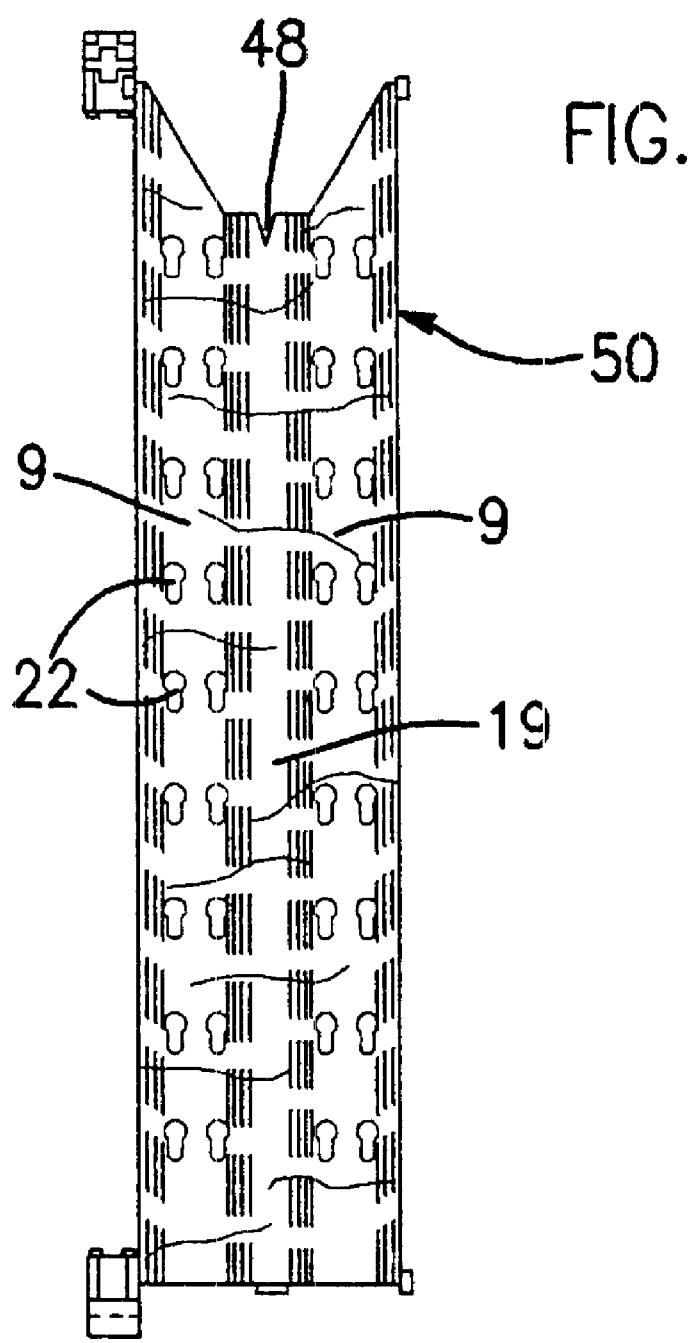
FIG. 14 is a front elevational view similar to FIG. 8 and showing the tarp.

The tarpaulin 50 (FIG. 14) is fixed to the louvers, for example with articulation riders 30 (FIG. 10) connecting the sleeves 13 and provided with a protection 31 each having a hole 32 for the securement of the tarpaulin.

Preferably, the vertical axles 12 are mounted in the carriage 10 respectively with the interposition of an upper spring 33 and a lower spring 34 (see FIG. 10), so as to limit the resulting forces in particular from deformations of the frame constituted by the lower rail 1 and upper rail 2.

The louvers 9 have bent edges 20 for reasons of rigidification and the upper edge 21 is inclined so as to form, in the closed position, a V in each pair of shutters 9, to receive the upper part of the tarpaulin during and after closing. This upper portion of the tarpaulin can be provided, in a manner known per se, with a sealing bib or with a bent edge 48 which forces the folding of the tarpaulin into the V shape cutout of each pair of louvers.

Preferably, according to the embodiment of FIGS. 8 and 9, the louvers 9 are provided, for at least certain of them, with openings 22 in the form of locking holes which permit lightening the assembly and, above all, for easily mounting and unmounting accessories such as transverse suspension bars, cables or holding straps, padding, etc.

Provision can also be made to mount profiles (not shown) serving as anchoring bars for cross pieces serving for the mounting of an intermediate platform.

There can easily be arranged in the lower portion a sealing cable for safe transport and/or passage through customs.

Figure 3:
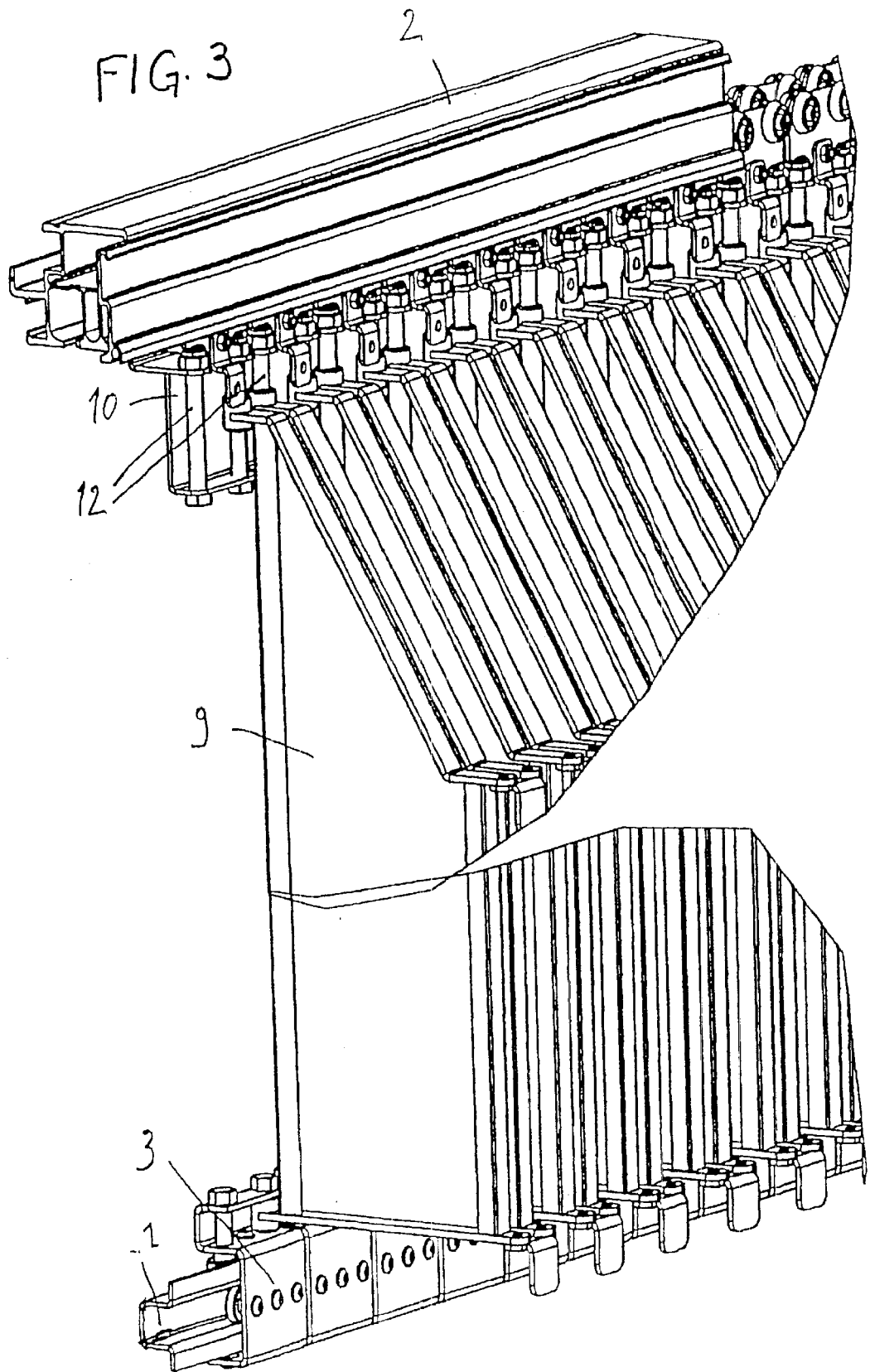
FIG. 3 is analogous to FIGS. 1 and 2, for the open position.

The equipment according to the invention can preferably replace a rail coach with laterally opening doors, because of its particularly competitive cost. It moreover solves all the drawbacks of the conventional systems with sliding tarpaulins, while ensuring a maximum opening width for loading, the folded assembly (FIG. 3) having a total length only of the order of 2 meters.

A particular advantage is the omission of intermediate posts, blind slats and side panels. The omission of numerous vertical straps considerably accelerates the speed and facility of opening and closing. The absence of external projections and perfectly flat tarpaulin surfaces permit efficacious washing in a roller machine and limit the overall width of the vehicle.

The use of metallic louvers offers considerably protection against theft, because even after cutting out the tarpaulin with a cutter, the slots between the louvers are sufficiently narrow so as not to permit the removal of packages or objects. The louvers moreover permit emplacing accessories, in the same way as with a much more costly and heavy wagon.

The structure according to the invention moreover permits adapting it to deformations thanks to the possibility of sliding of the upper portion of the louvers 9, by means of pins 13 on axles 12 of the upper carriages 10, with absorption of the stresses in the case of the interposition of springs 33, 34.

Preferably, the end louvers $9_1$ are provided with a sliding bolt 43 (FIGS. 11, 12, 13) provided with a handle 44. In a locking position (FIG. 11), the bolt 43 locks the end louver $9_1$ relative to the lower rail 1 by passing through the lower carriage 3. In an intermediate position (FIG. 12), the bolt 43 has unlocked the louver $9_1$ relative to the lower rail 1 but also secures the louver and the lower carriage together. Finally, in a completely unlocked position (FIG. 13), the bolt 43 is completely withdrawn such that the end louver $9_1$ can pivot relative to the adjacent louver 9.

I claim:

1. Transport container, independent or mounted on a vehicle, comprising a horizontal loading surface of generally rectangular shape of which at least one side surface is provided with tarpaulin side walls mounted longitudinally slidably on an upper rail, wherein said tarpaulin walls are hung from an assembly of rigid accordion folding louvers, an upper end of said louvers sliding on said upper rail in upper carriages with casters and being articulated on said upper carriages while the lower end of said louvers slides on a lower rail on lower carriages with rollers and are articulated on said lower carriages, said lower rail carrying the upper rail.

2. Transport container according to claim 1, wherein the louvers are metallic, wooden, synthetic material or of composites.

3. Transport container according to claim 1, wherein the louvers are assembled by pairs of two louvers (twice) pivoting respectively on an upper articulation member and a lower articulation member.

4. Transport container according to claim 3, wherein the lower carriages and the upper carriages are arranged to receive two pairs of adjacent louvers.

5. Transport container according to claim 3, wherein, in each pair of louvers, the upper edges of each louver are inclined convergently downwardly.

6. Transport container according to claim 3, wherein the upper articulation members and the lower articulation members are arranged such that the pair of louvers, in the closed position, form a slight reentrant angle.

7. Transport container according to claim 1, wherein the lower carriages are mounted with close guidance on the lower rails, the upper carriages being mounted suspended from the upper rails.

8. Transport container according to claim 7, wherein the casters of the upper carriages are mounted in longitudinal recesses of the upper rails whose bottom and summit are rounded.

9. Transport container according to claim 7, wherein the articulation of the louvers on the lower carriages is without play while the louvers are mounted for vertical sliding on the upper carriages.

10. Transport container according to claim 9, wherein a plurality of springs are disposed so as to cushion the vertical sliding on each of the louvers on the upper carriages.

11. Transport container according to claim 1, wherein at least some of the louvers are provided with holes.

12. Transport container according to claim 11, wherein the holes are locking holes.

13. Transport container according to claim 1, wherein narrow slots are provided between the louvers in the closed position.

14. Transport container according to claim 1, wherein an end louver of the assembly of louvers is provided with a sliding bolt to coact with the lower adjacent carriage and the lower rail and to be disengaged from the lower rail and then from the lower carriage.

15. A transport container, independent or mounted on a vehicle, comprising:

a horizontal loading surface of generally rectangular shape of which at least one side surface is provided with tarpaulin side walls mounted longitudinally slidably on an upper rail;

a plurality of upper carriages having casters;

a plurality of lower carriages having rollers;

an assembly of rigid accordion folding louvers, an upper end of said louvers sliding on said upper rail on said plural upper carriages; and a lower rail, a lower end of each said louvers sliding on said lower carriages, said lower rail carrying the upper rail, wherein said tarpaulin side walls hang from said louvers, wherein the louvers are assembled by pairs of two louvers, and wherein in each pair of louvers, an upper edge of each louver is inclined convergently downwardly.

* * * * *